United States Defensive Publication [19] (H) [11] T101,102

Turner [43] Oct. 6, 1981

[54] PIGMENTED COATING OF POLYESTER/COTTON SPUN YARNS

[76] Inventor: John J. P. Turner, 2613 Marhill Dr., Wilmington, Del. 19810

[21] Appl. No.: 220,808

[22] Filed: Dec. 29, 1980

[51] Int. Cl.[3] ..... B05D 1/00; B05D 3/00; B05D 3/02

[52] U.S. Cl. ..... 8/495; 8/653; 427/389.9; 427/401

[57] ABSTRACT

Polyester/cotton 50/50 spun yarns suitable for use as the warp yarns of denim fabric are obtained by first dyeing the yarns with indigo dye, coating the yarns with a dispersion of a polyol binder and a pigment that imparts coloration similar to indigo-dyed cotton fibers and then drying the yarns, and where appropriate, curing the coated yarn and supplying heat as by singeing to thermosol some of the pigment into the polyester fiber on the surface of the yarn. The polyol binder may be starch but preferably is polyvinyl alcohol in combination with a water soluble polyamide containing secondary amino groups in the polymer chain which have been reacted with epichlorohydrin. The pigment preferably is a combination of Color Index Disperse Blue 56 dye and carbon black.

7 Claims, No Sheets Drawing,

8 Pages Specification

The file of this unexamined application may be inspected and copies thereof may be purchased (849 O.G. 1221, Apr. 9, 1968).